(12) United States Patent
Fujioka et al.

(10) Patent No.: US 10,741,298 B2
(45) Date of Patent: Aug. 11, 2020

(54) SCINTILLATOR PANEL AND PRODUCTION METHOD FOR SAME, AND RADIATION DETECTION APPARATUS

(71) Applicant: Toray Industries, Inc., Tokyo (JP)

(72) Inventors: Nobuyasu Fujioka, Otsu (JP); Tomohiro Morinaga, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 10 days.

(21) Appl. No.: 16/093,261

(22) PCT Filed: Mar. 23, 2017

(86) PCT No.: PCT/JP2017/011652
§ 371 (c)(1),
(2) Date: Oct. 12, 2018

(87) PCT Pub. No.: WO2017/187854
PCT Pub. Date: Nov. 2, 2017

(65) Prior Publication Data
US 2019/0131027 A1 May 2, 2019

(30) Foreign Application Priority Data
Apr. 27, 2016 (JP) .................. 2016-088897

(51) Int. Cl.
*G01T 1/20* (2006.01)
*G21K 4/00* (2006.01)
(Continued)

(52) U.S. Cl.
CPC .............. *G21K 4/00* (2013.01); *C03C 3/062* (2013.01); *C03C 17/007* (2013.01); *G01T 1/2002* (2013.01); *G01T 1/202* (2013.01)

(58) Field of Classification Search
CPC .......... A61B 6/00; A61B 6/102; A61B 6/105; A61B 6/4405; A61B 6/4429;
(Continued)

(56) References Cited

U.S. PATENT DOCUMENTS 5,418,377 A * 5/1995 Tran .................... G21K 4/00
250/483.1
5,519,227 A * 5/1996 Karellas .................. G01T 1/202
250/370.11
(Continued)

FOREIGN PATENT DOCUMENTS

DE 102006033497 A1 * 1/2008 .......... G01T 1/2002
JP 0560871 A 3/1993
(Continued)

OTHER PUBLICATIONS

International Search Report and Written Opinion for International Application No. PCT/JP2017/011652, dated Jun. 13, 2017—6 pages.

*Primary Examiner* — Irakli Kiknadze
(74) *Attorney, Agent, or Firm* — RatnerPrestia

(57) ABSTRACT

A scintillator panel has a barrier rib structure, whereby opposing light-receiving substrates can be aligned with high precision and bonded with a photoelectric conversion element. In the scintillator panel, cells demarcated by lattice shaped barrier ribs formed on a sheet-shaped base member are filled with a phosphor for receiving radiation and emitting light, thereby configuring a pixel structure. The scintillator panel has portions in which the lattice-shaped barrier ribs are exposed on both a front surface and a back surface in a portion of a non-display region of the panel external periphery. The exposed parts are optically transparent.

7 Claims, 5 Drawing Sheets

(51) Int. Cl.

| | |
|---|---|
| *C03C 3/062* | (2006.01) |
| *C03C 17/00* | (2006.01) |
| *G01T 1/202* | (2006.01) |
| *G21K 1/12* | (2006.01) |
| *H05G 1/04* | (2006.01) |

(58) Field of Classification Search
CPC ....... A61B 6/4476; A61B 6/54; A61B 6/0457; A61B 6/04; A61B 6/03; A61B 6/0407; A61B 6/0421; A61B 6/10; A61B 6/4464; A61B 6/4208; A61B 6/4233; A61B 6/484; A61B 6/4291; A61B 6/465; A61B 6/469; A61B 6/542; A61B 6/544; A61B 6/548; A61B 6/42; G01N 23/046; G01N 23/041; G01N 23/20075; G01N 23/20041; G01T 1/2018; G01T 1/2002; G01T 1/202; G01T 1/20; G01T 1/247; G01T 1/2023; G01T 1/24; G01T 1/244; G01T 1/2928; G01T 1/2971; G01T 1/006; G01T 1/1642; G01T 1/2008; G01T 1/201; G01T 1/295; G01T 1/2985; G01T 7/005; G21K 4/00; G21K 2004/02; G21K 2004/06; H01L 27/14625; H01L 27/14663; H01L 31/02008; H01L 31/0504; H01L 31/0508; H01L 31/0516; H01J 2235/086; H01J 35/08; H01J 2235/081; H01J 35/10; H01J 35/112; H01J 35/12; H01J 35/28; H01J 2235/1291; H01J 35/14; H01J 35/16; H01J 35/26; C04B 2235/3224; C04B 35/547; C04B 35/645; C04B 2235/3203; C04B 2235/3229; C04B 2235/445; C04B 2235/5436; C04B 2235/6562; H04L 67/12

USPC .............................. 378/19, 98.8; 250/370.11
See application file for complete search history.

(56) References Cited

U.S. PATENT DOCUMENTS

| | | | |
|---|---|---|---|
| 5,956,382 A * | 9/1999 | Wiener-Avnear | G01T 1/20 |
| | | | 250/367 |
| 6,298,113 B1 * | 10/2001 | Duclos | G01T 1/2002 |
| | | | 250/367 |
| 8,338,790 B2 * | 12/2012 | Levene | G01T 1/202 |
| | | | 250/367 |
| 9,177,683 B2 | 11/2015 | Iguchi et al. | |
| 2006/0131509 A1 * | 6/2006 | Matz | G01T 1/2018 |
| | | | 250/370.11 |
| 2017/0236609 A1 | 8/2017 | Tanino et al. | |

FOREIGN PATENT DOCUMENTS

| | | |
|---|---|---|
| JP | 05188148 A | 7/1993 |
| JP | 2002228757 A | 8/2002 |
| JP | 2011007552 A | 1/2011 |
| WO | 2012161304 A1 | 11/2012 |
| WO | 2016021540 A1 | 2/2016 |

\* cited by examiner

SCINTILLATOR PANEL AND PRODUCTION METHOD FOR SAME, AND RADIATION DETECTION APPARATUS

CROSS REFERENCE TO RELATED APPLICATIONS

This is the U.S. National Phase application of PCT/JP2017/011652, filed Mar. 23, 2017, which claims priority to Japanese Patent Application No. 2016-088897, filed Apr. 27, 2016, the disclosures of these applications being incorporated herein by reference in their entireties for all purposes.

FIELD OF THE INVENTION

The present invention relates to a scintillator panel that constitutes a radiation detection apparatus for use for medical diagnosis apparatuses, nondestructive testing apparatuses, etc. and to a production method for the scintillator panel.

BACKGROUND OF THE INVENTION

X-ray images using films have been widely used at medical sites. However, since the X-ray images based on use of films are analog image information, digital-mode radiation detection apparatuses, such as computed radiography (computed radiography, CR), a flat panel X-ray detection apparatus (flat panel detector, FPD), or the like have been developed in recent years.

In FPDs, a scintillator panel is used in order to convert radiation ray into visible light. The scintillator panel includes an X-ray fluorescent such as cesium iodide (CsI). According to applied X-rays, the X-ray fluorescent emits visible light and the emitted light is converted into electrical signals by TFTs (thin film transistors) or CCDs (charge-coupled devices), so that X-ray information is converted into digital image information. However, the FPD has a problem of low S/N ratio. This results from, among other causes, the scattering of visible light due to the X-ray fluorescent itself when the fluorescent emits light. In order to lessen the effect of the scattering of light, methods in which a fluorescent is filled in cells partitioned by partition walls have been proposed (Patent Documents 1 to 4).

As a related-art method for forming such partition walls, a method in which a silicon wafer is etched is known. However, in this method, the size of scintillator panels that can be formed is limited by the size of the silicon wafers, and a scintillator panel as large in size as 500 mm square cannot be obtained. On another hand, a technology in which, using a glass powder-containing paste, a scintillator panel is produced by highly accurately forming, in a large area, barrier rib whose main component is a low softening point glass containing 2 to 20 mass % of an alkali metal oxide (Patent Document 4).

PATENT DOCUMENTS

Patent Document 1: Japanese Unexamined Patent Publication (Kokai) No. HEI 5-60871
Patent Document 2: Japanese Unexamined Patent Publication (Kokai) No. HEI 5-188148
Patent Document 3: Japanese Unexamined Patent Publication (Kokai) No. 2011-7552
Patent Document 4: International Publication WO 2012/161304

SUMMARY OF THE INVENTION

In order to fully bring out the advantages of a scintillator that includes a cell structure formed by barrier ribs, it is important that the pixels of photoelectric conversion elements arranged on a light-receiving substrate that faces the scintillator and that the pixels formed by the barrier ribs be laminated together without misalignment. When positional misalignment occurs between opening portions of barrier ribs that are portions for light emission by scintillation, and the photoelectric conversion elements, the light-receiving areas contain presence of the barrier ribs, which do not emit light, so that the light-receiving efficiency decreases. Furthermore, emitted light leaks into adjacent photoelectric conversion elements, resulting in an unfavorable effect of failing to bring about a proper image sharpness. Avoiding this requires a technology in which a scintillator panel and photoelectric conversion elements are aligned with each other and accurately laminated together. To this end, a technique in which the scintillator panel and on the photoelectric conversion elements are both provided with alignment marks formed outside of display regions and these alignment marks are caused to coaxially coincide with each other when the lamination is carried out is sometimes used.

However, the techniques for forming alignment marks that retain highly accurate positional relationship with the pixels of the display regions are limited to photolithography and the like, thus giving rise to restrictions regarding process methods. Furthermore, in the case where the thickness of the barrier ribs are great, there is a need to perform alignment during a state in which marks are spaced apart from each other, so that, affected by a camera's optical axis misalignment, accuracy of the alignment decreases. It is also a problem that after the lamination, positional misalignment check cannot be performed.

The foregoing problems can be worked out by any one of the following technical means.
(1) A scintillator panel that has a pixel structure in which cells divided by a barrier rib of a lattice shape formed on a base member of a sheet shape are loaded with a fluorescent that, when receiving a radiation ray, emits light, the scintillator panel including, in at least a portion of a non-display region in an outer perimeter portion of the panel, a portion in which the barrier rib of the lattice shape is exposed on both obverse and reverse sides, wherein the exposed portion has a light-transmitting property.
(2) The scintillator panel according to (1) wherein the barrier rib of the lattice shape is made of a material whose main component is a low melting point glass that contains 2 to 20 mass % of an alkali metal oxide.
(3) The scintillator panel according to (1) or (2) wherein a surface of the barrier rib is provided with a reflective layer.
(4) A method for producing the scintillator panel according to any one of (1) to (3), the production method for the scintillator panel including a step of coating on a base member A a photosensitive paste that contains a low melting point glass and a photosensitive organic component and forming a photosensitive paste coat film, an optical exposure step of optically exposing the photosensitive paste coat film to a predetermined pattern, a development step of dissolving and removing a portion of a post-optical-exposure photosensitive paste coat film which is soluble in a developing solution, a bake step of forming barrier ribs by heating a post-development photosensitive paste coat film pattern to a bake temperature of 500° C. to 700° C. so that an organic component is removed and the low melting point glass is softened and sintered, a step of forming a scintillator layer by loading a fluorescent between the barrier ribs, a step of detaching the scintillator layer from the base member A, and a step of laminating the scintillator layer on a base member B at least a portion of which has an opening portion or a cutout portion.

(5) A radiation detection apparatus in which the scintillator panel according to any one of (1) to (3) and a light-receiving substrate that include photoelectric conversion elements arranged so that a pixel pitch of the photoelectric conversion elements corresponds to a pixel pitch of the barrier rib of the lattice shape of the scintillator panel are laminated together.

(6) The radiation detection apparatus according to (5) wherein the pixel pitch of the barrier rib of the lattice shape is an integer multiple of the pixel pitch of the photoelectric conversion elements.

(7) The radiation detection apparatus according to (5) or (6) wherein the non-display region in the outer perimeter portion of the scintillator panel is adhered to the light-receiving substrate by an adhesive resin or a tacky tape.

According to the present invention, as a scintillator panel surface exposes the barrier rib having a penetration structure which is formed in the scintillator, the alignment can be carried out by taking an image of the photoelectric conversion element pattern of the light-receiving substrate through the exposed portion, via a camera or the like. Furthermore, because the scintillator panel and the photoelectric conversion elements can be brought close to each other and aligned with each other, highly accurate alignment becomes possible. Therefore, in the radiation detection apparatus that uses the scintillator panel of the present invention, the misalignment between the pixel pitches of the barrier rib and the photoelectric conversion elements is lessened, so that the light-receiving efficiency is high and the image sharpness is excellent. Furthermore, the state of the alignment can be checked after the scintillator panel and the light-receiving substrate are laminated together.

DETAILED DESCRIPTION OF EMBODIMENTS OF THE INVENTION

Preferred constructions of the radiation detection apparatus that uses the scintillator panel of the present invention will be described hereinafter, using the drawings. However, the present invention is not limited to these constructions. As for the radiation ray in the present invention, electromagnetic radiation, such as X-ray and γ-ray, and particle radiation, such as α-ray, β-ray, and neutron ray, can be used. Among these, X-ray is preferably used.

Figure 1:
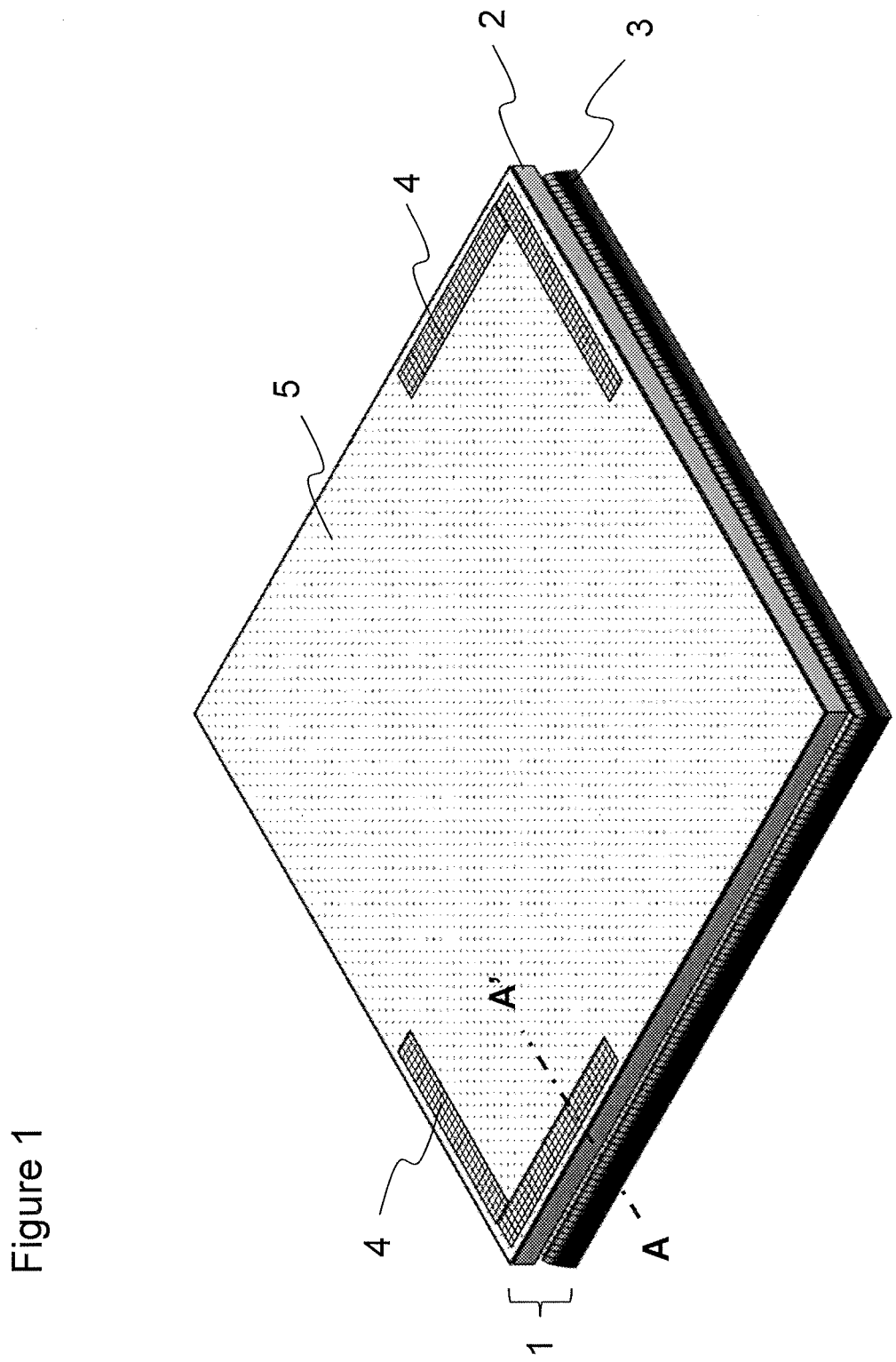
FIG. 1 is a perspective view schematically representing a construction of the scintillator panel of the present invention.

FIG. 1 is a perspective view schematically representing a construction of a radiation detection apparatus that includes the scintillator panel of the present invention. The radiation detection apparatus 1 is made up of a scintillator panel 2 and a light-receiving substrate 3. The scintillator panel 2 includes a scintillator layer made of a fluorescent. The scintillator panel 2 absorbs energy of incoming radiation rays, such as X-ray, and radiates electromagnetic waves whose wavelengths are in the range of 300 to 800 nm, that is, electromagnetic waves (light) in a range from ultraviolet light through infrared light through the entire visible light rays. On an upper surface of the scintillator panel 2, there is disposed a base member 5. Portions of the base member 5 have base member opening portions 4. Each base member opening portion 4 is disposed in a portion of a non-display region and exposes a barrier rib of a lattice shape. The non-display region is a region that is provided along an outer perimeter of the scintillator panel 2 and that does not contribute to light emission.

Figure 2:
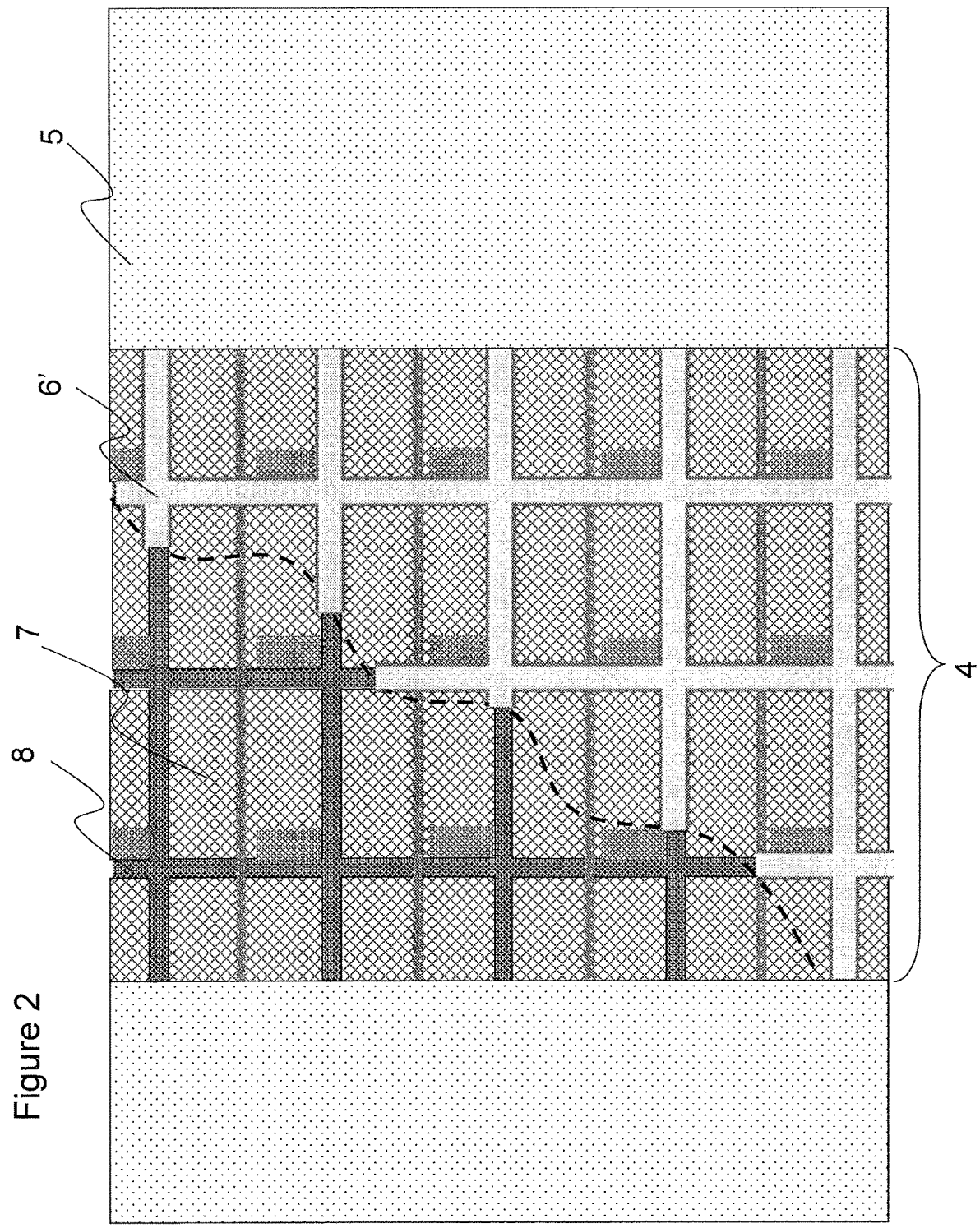
FIG. 2 is a front view schematically representing a construction of the scintillator panel of the present invention.

FIG. 2 is a front view schematically representing a base member opening portion 4 and its surroundings. The base member opening portion 4 is provided on top of a penetrating barrier rib 6' of a lattice shape. The penetrating barrier rib 6' has light-transmitting property. Here, the light-transmitting property refers to a property that because the barrier rib has a penetration structure, the barrier rib allows an object at the far side of the barrier rib to be seen through the barrier rib when an image thereof is taken by a camera or the like. Because the penetrating barrier rib 6' has the light-transmitting property, it is possible to view, through the penetrating barrier rib 6', photoelectric conversion elements 7 arranged on a lower surface. The penetrating barrier rib 6' is laminated on the photoelectric conversion elements 7 so as to be superimposed on a wiring pattern 8 along perimeters of the individual photoelectric conversion elements 7. Therefore, pixels of the barrier rib and the photoelectric conversion elements 7 have a one-to-one correspondence. The penetrating barrier rib 6' exposed in each base member opening portion 4 can be used as alignment marks for laminating the scintillator panel 2 and the light-receiving substrate 3 together. Because of not having a fluorescent layer, the penetrating barrier rib 6' is a non-display region that does not contribute to light emission. Therefore, forming the base member opening portions 4 in necessary minimum areas in an outermost perimeter portion of the scintillator panel 2 allows a large effective display-region to be taken and is preferable. Furthermore, disposing the base member opening portions 4 in corner portions of the panel in the non-display region of the scintillator panel 2 allows the simultaneous checking in the X direction and the Y direction of the panel while requiring only small areas and is therefore preferable.

Figure 3:
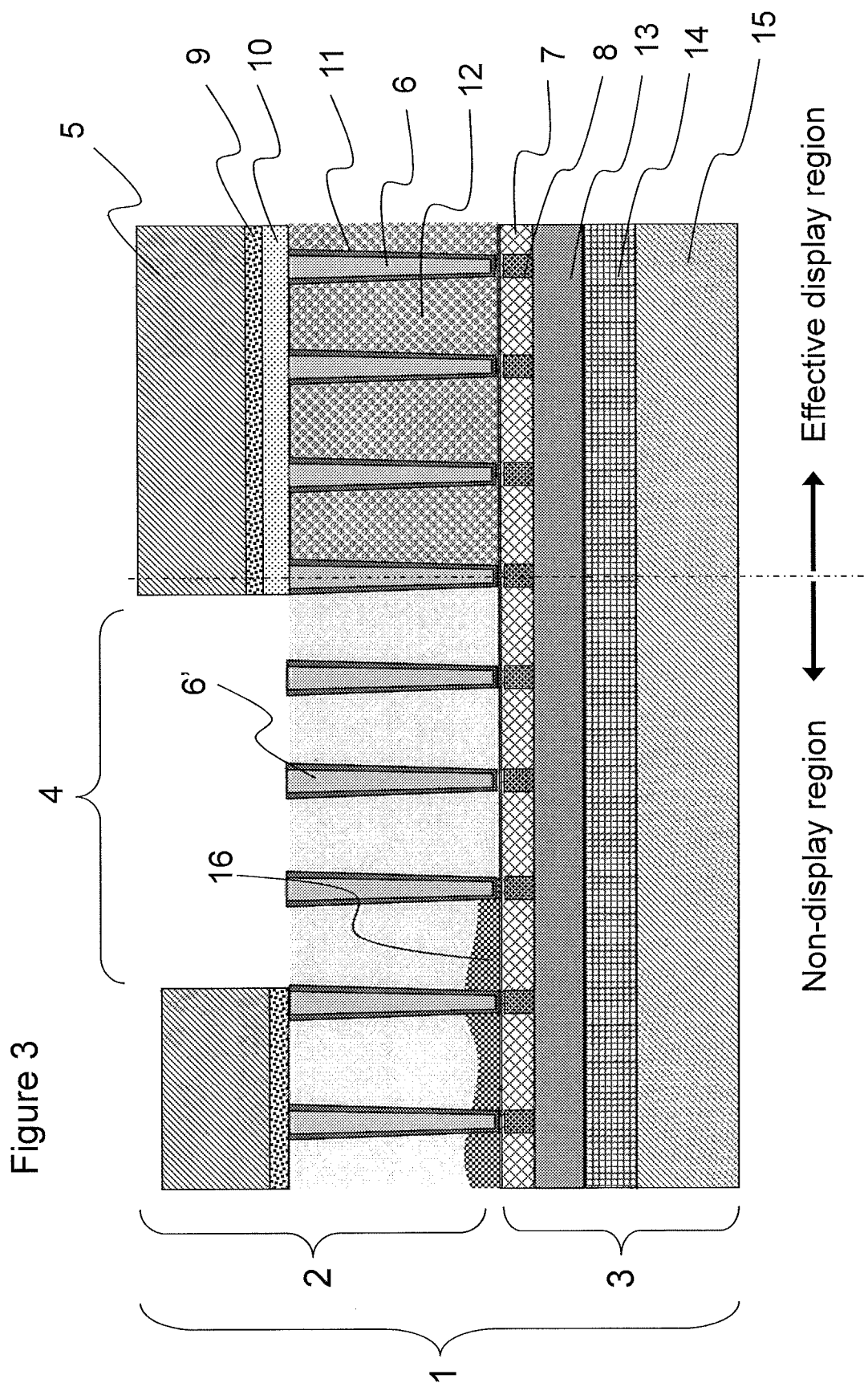
FIG. 3 is a sectional view of the scintillator panel of the present invention on A-A' in FIG. 1.

FIG. 3 is a sectional view obtained when a portion that includes a base member opening portion 4 is cut (A-A' in FIG. 1). The scintillator panel 2 has a construction in which the flat sheet-shaped base member 5 and a scintillator layer that includes the barrier rib 6 are laminated together via a sticky layer 9. In the effective display region, spaces divided by the barrier rib 6 form cell structures and a fluorescent 12 is loaded in the cells. Surfaces of the barrier rib 6 have a reflective layer 11 formed thereon. A barrier rib-reinforcing layer 10 is provided between the barrier rib 6 and the sticky layer 9. On the other hand, the non-display region is not loaded with the fluorescent 12 and is constructed of the penetrating barrier rib 6' provided without the barrier rib-reinforcing layer 10. The base member opening portions 4 are provided in the non-display region.

The scintillator panel 2 and the light-receiving substrate 3 are adhered together by an adhesion layer 16 in the non-display region. The adhesion layer 16 may possibly bring about formation of a gap between the barrier rib 6 and the light-receiving substrate 3 and result in a decrease in image sharpness due to light leakage to adjacent cells. Therefore, it is preferable to provide the adhesion layer 16 in the non-display region.

The light-receiving substrate 3 is made up of a photoelectric conversion portion in which the photoelectric conversion elements 7 and the wiring pattern 8 are two-dimensionally formed on a substrate 14 and of an output layer 13 and an electric power source portion 15. When light produced by radiation ray reaches a photoelectric conversion element 7, an electrical signal is output via the output layer 13.

In the scintillator panel of the present invention, since the individual cells are partitioned by the barrier rib, the photoelectric conversion element 7 and the scintillator panel 2 can be laminated together so that the pixel pitch of the photoelectric conversion element 7 and the barrier rib pixel pitch of the scintillator panel 2 correspond to each other. At this time, the photoelectric conversion elements 7 can be viewed from the base member opening portion 4 through the penetrating barrier rib 6'. Therefore, the lamination can be accomplished with easy and highly accurate alignment.

Figure 4:
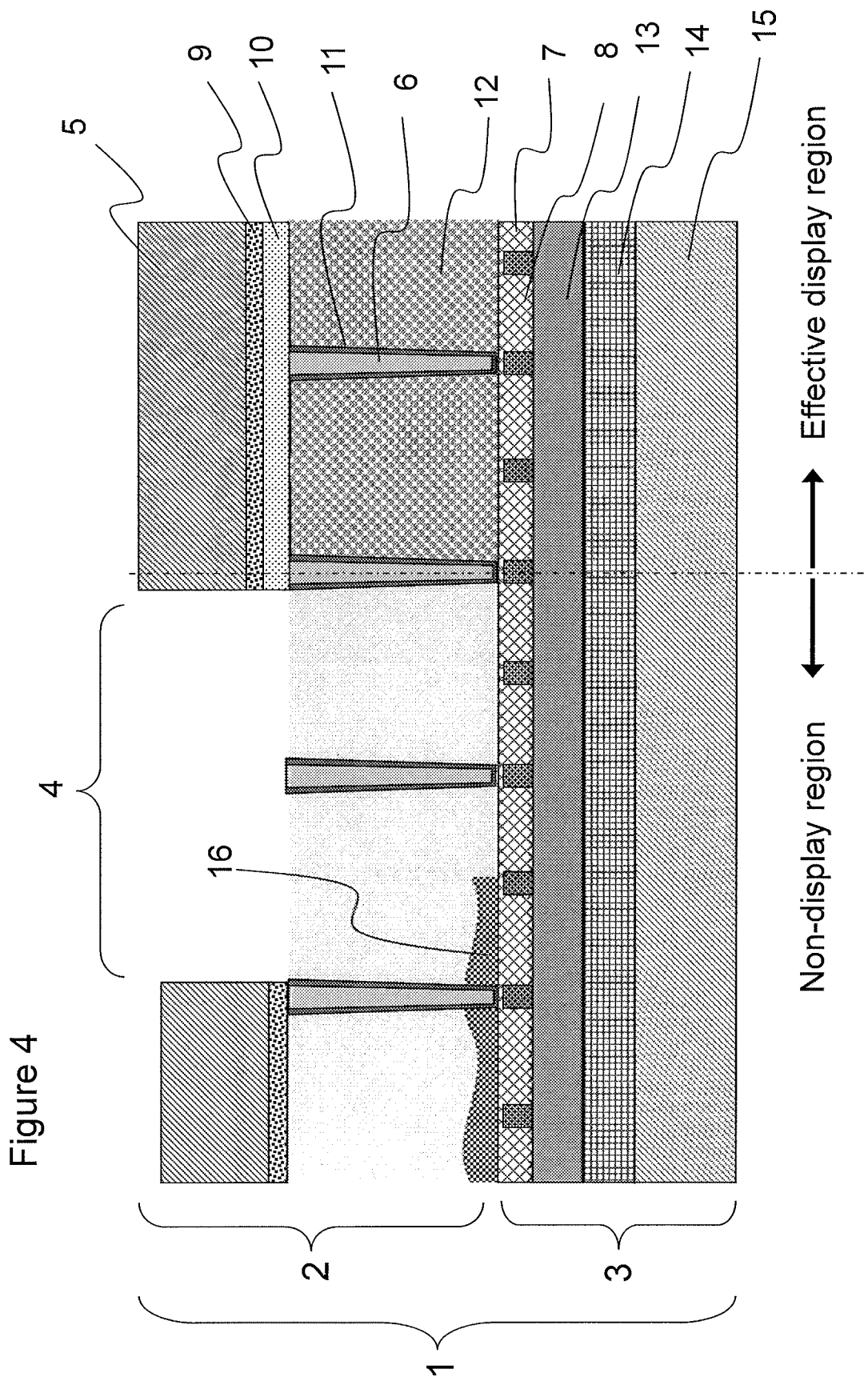
FIG. 4 is a sectional view of the scintillator panel of the present invention on A-A' in FIG. 1.

FIG. 4 is a sectional view of a radiation detection apparatus in which the cell pitch of the scintillator panel 2 is twice the pixel pitch of the photoelectric conversion elements 7. Setting the barrier rib pixel pitch to an integer multiple of the pixel pitch of the photoelectric conversion elements 7 in this manner also makes it possible to achieve correspondence between the pixel pitch of the photoelectric conversion elements 7 and the barrier rib pixel pitch of the scintillator panel 2 when carrying out the lamination. Therefore, it is possible to secure an amount of light emission without considerably decreasing the image sharpness. Increasing the multiplier increases the amount of light emission but lessens the effect of the barrier rib that prevents the light leakage to adjacent cells and therefore decreases the image sharpness. Therefore, effectually, the multiplication by one, two or three is preferable and the multiplication by two is more preferable.

Figure 5:
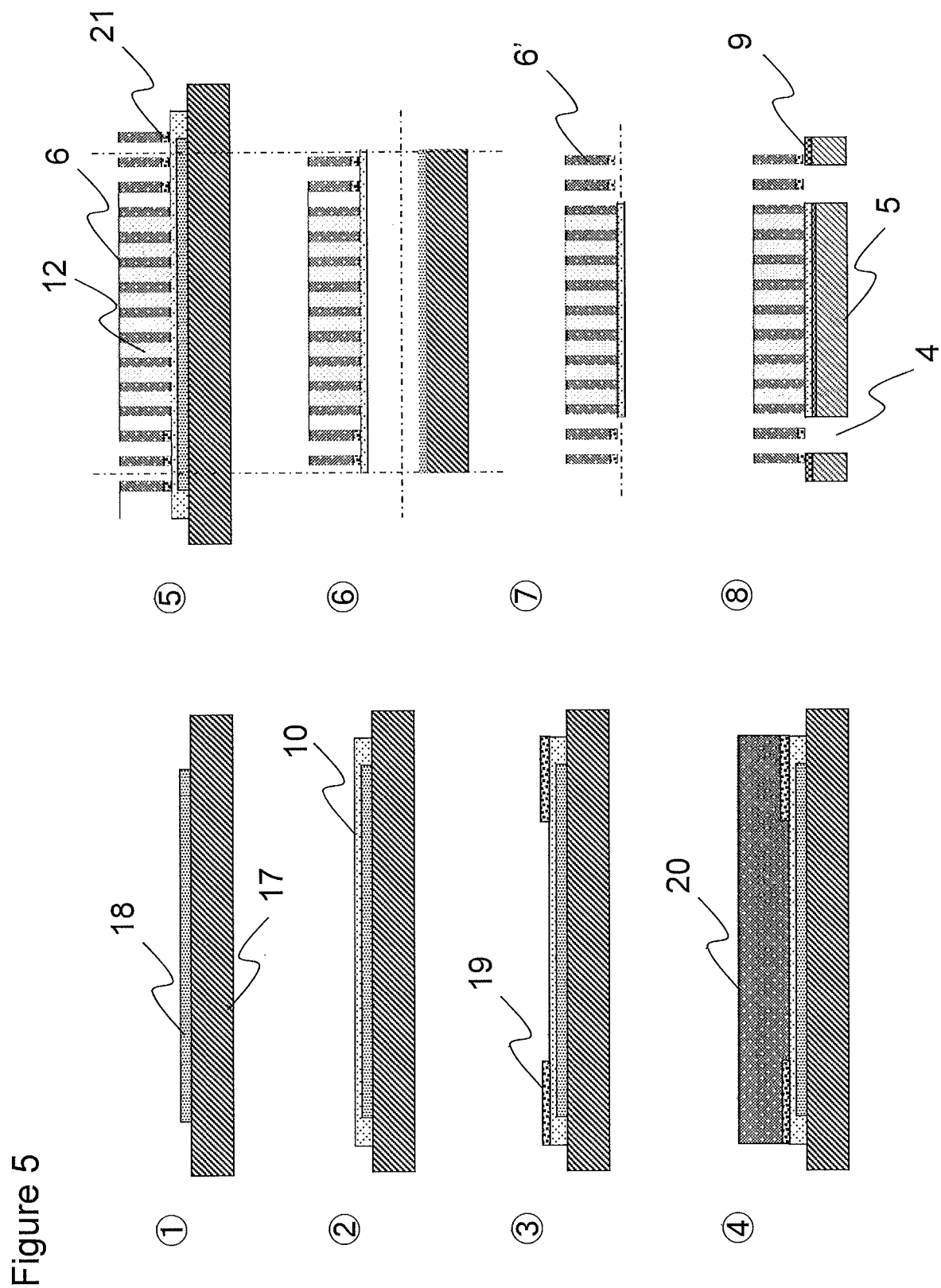
FIG. 5 illustrates an example of the production method for the scintillator panel of the present invention.

An example of the production method for a scintillator panel 2 of the present invention will be given below. As illustrated in FIG. 5, on a surface of a flat sheet-shaped base member A (17), a glass powder-containing paste B is coated over the entire surface by using a screen printing method or the like and is dried to obtain a coat film B (18). A glass powder-containing paste C is coated over the entire surface of the coat film B by using a screen printing method or the like and is dried to obtain a coat film C. It is preferable that the coat film C be formed so as to completely cover and hide the coat film B. These are baked to remove organic components. The glass powder-containing paste B containing as a main component an inorganic powder that has a melting point higher than or equal to the bake temperature and the glass powder-containing paste C containing as a main component a low melting point glass powder that has a melting point lower than or equal to the bake temperature will allow the baking to provide the coat film B as a non-sintered layer and the coat film C covering the coat film B as a sintered layer. The coat film B being provided as a non-sintered layer will allow the coat film B to serve as a detachment aiding layer for layer detachment that is carried out in a later step. Since the coat film C, which is a sintered layer, is firm, the coat film C can serve as a barrier rib-reinforcing layer (10) for stably forming a barrier rib of a lattice shape. On the coat film C, a glass powder-containing paste D is coated by using a screen printing method or the like, and is dried to obtain a coat film D (19). It is preferable that the coat film D be pattern-formed to have a frame shape around a barrier rib pattern formation range. On the coat films C and D, a glass powder-containing paste E is coated into a sheet shape by using a slit-die coater or the like, and is dried to obtain a coat film E (20). The coat films D and E are subjected to pattern processing by photolithography or the like to obtain a barrier rib pattern of a lattice shape. This is baked to remove organic components, so that a barrier rib (6) is obtained. The glass powder-containing paste D containing as a main component a glass powder that has a melting point higher than or equal to the bake temperature and the glass powder-containing paste E containing as a main component a low melting point glass powder that has a melting point lower than or equal to the bake temperature will make it possible to provide the coat film D as a non-sintered barrier rib (21) and the coat film E as a sintered barrier rib. A reflective layer F (not depicted in FIG. 5) is formed so as to cover the surface of the barrier rib that has been formed. Furthermore, interiors of the cells divided by the barrier rib are loaded with a fluorescent G (12). At this time, the fluorescent G is not loaded in the non-sintered barrier rib portion formed by the coat film D. Next, an outer perimeter portion of a barrier rib pattern that includes the coat film B of the base member A is cut, so that the base member A ranging from, as a start point, the coat film B that is a detachment aiding layer and a scintillator layer that is above the barrier rib supporting layer formed by the base member A and the coat film C can be detached from each other. Furthermore, a barrier rib supporting layer ranging from, as a start point, the non-sintered barrier rib portion formed by the coat film D is detached and removed, so that surroundings of the barrier rib can be provided with a penetration structure in which the barrier rib supporting layer is not present. This is laminated onto a base member B (5) made of a material whose radiation ray absorption is small, such as a film, by using a sticky layer (9), so that a scintillator panel 2 can be produced.

As the base member A, it is possible to use:
a ceramics sheet of alumina, aluminum nitride, etc.;
a glass ceramics sheet obtained by mixing a ceramics powder and
a powder of glass and sintering the mixture; and
a metal sheet, such as an aluminum sheet, an iron sheet, a copper sheet, etc.;
preferably, a glass sheet made of a glass, such as quartz, borosilicate glass, chemically reinforced glass, etc.; etc.

It is preferable that the base member be highly heat resistant. Here, the highly heat resistant base member refers to a base member which does not burns out in the bake step and whose rate of volume change at room temperature before and after the bake step is 20% or less. Use of a highly heat resistant base member will minimize the influence of changes in the pitch during the bake step and the like. In the case where the coefficient of linear expansion of the base member is $\alpha s$ ($K^{-1}$) and the coefficient of linear expansion of the glass that is a component of the barrier rib material is $\alpha g$ ($K^{-1}$), it is preferable that the absolute value $|\alpha s - \alpha g|$ of a difference between $\alpha s$ and $\alpha g$ be less than or equal to $200 \times 10^{-7}$ ($K^{-1}$) in order to inhibit the warpage of the base member during the bake step, and it is more preferable that the absolute value $|\alpha s - \alpha g|$ be less than or equal to $50 \times 10^{-7}$ ($K^{-1}$).

The glass powder-containing paste B is a non-sintering paste and is a paste that contains as a main component an inorganic component an inorganic powder not sintered in the bake step (hereinafter, sometimes referred to as "non-sintering inorganic powder"). Containing the non-sintering inorganic powder as a main component in the inorganic component refers to a state that 50 to 100 vol % of the inorganic component contained in the non-sintering paste is a non-sintering inorganic powder. Due to containing a non-sintering inorganic powder as a main component in the inorganic component, the non-sintering paste, serving as a detachment aiding layer, can inhibit fusion between the layer above the non-sintering paste and the base member in the bake step and facilitates the post-bake layer detachment and the detachment of the non-sintered layer. It is preferable that the percentage of the non-sintering inorganic powder in the inorganic component contained by the non-sintering paste be 70 to 100 vol %, and it is more preferable that the percentage thereof be 90 to 100 vol %.

As the non-sintering inorganic powder, for example, a glass powder or a ceramic powder whose softening temperature is higher than the bake temperature can be cited. It is preferable that the softening temperature of the powder be at least 50° C. higher than the bake temperature in order to prevent fusion of the powder with the base member in the bake step. More concretely, a high softening point glass powder or a ceramics particle of silicon oxide, aluminum oxide, titanium oxide, zirconium oxide, barium titanate, cobalt oxide, nickel oxide, etc. is preferable.

It is preferable that the volume average particle diameter of the non-sintering inorganic powder (hereinafter, sometimes referred to as "D50") be 0.01 to 20 μm, and it is more preferable that the volume average particle diameter thereof be 0.05 to 3.0 μm. When the D50 is less than 0.01 μm, there is tendency that layer detachment from the base member following the bake step will become difficult. On the other hand, when the D50 exceeds 20 μm, the detachment becomes excessively easy and the pattern sometimes partially peels off during baking.

The glass powder-containing paste B needs to contain 50 vol % or more of a non-sintering inorganic powder relative to the entire inorganic component. The paste B may contain a glass powder that sinters at the bake temperature in such a range of amount that the property of the detachment aiding layer is not impaired. Containing such a glass powder in an appropriate amount can sometimes inhibit the curling off or warpage of end portions of the pattern during baking.

The glass powder-containing paste B is made up of an inorganic component that contains a non-sintering inorganic powder that remains after the bake step and an organic component that thermally decomposes in the bake step. It is preferable that the amount of the organic component contained in the non-sintering paste be 20 to 80 mass %. When the amount of the organic component is less than 20 mass %, there is tendency that the dispersibility of the inorganic component in the paste will become low so that defect will occur in the bake step. On the other hand, when the amount of the organic component exceeds 80 mass %, there is tendency that the shrinkage in the bake step will become great so that defect, such as cracks, will occur.

As the organic component contained in the glass powder-containing paste B, a binder resin, a curable monomer, a polymerization initiating agent, a dispersing agent, or an organic solvent is preferable.

As the method for coating the glass powder-containing paste B, for example, a screen printing method, a bar coater, a roll coater, a die coater, a blade coater, etc. can be cited. After the coating by these methods, drying will provide the coat film B.

It is preferable that the thickness of the coat film B be 0.1 to 100 μm, and it is more preferable that the thickness thereof be 0.2 to 50 μm, and it is even more preferable that the thickness thereof be 1 to 10 μm. When the thickness of the coat film B is less than 0.2 μm, there is tendency that it will become less easy to detach a three-dimensional structural object from the base member after the bake step. On the other hand, when the thickness exceeds 50 μm, detachment becomes excessively easy and the pattern sometimes partially peels off during the bake step.

The glass powder-containing paste C is made up of an organic component and an inorganic component that contains glass powder. It is preferable that the content of the glass powder in the glass powder-containing paste C be 10 to 95 mass %.

It is preferable that the glass powder contained by the glass powder-containing paste C be a glass that softens at the bake temperature, and it is more preferable that the glass powder be a low melting point glass whose softening temperature is 700° C. or lower. Due to this, a sintered layer is formed after baking and can serve as a barrier rib-reinforcing layer that performs the role of maintaining the strength of the barrier rib. Furthermore, use of the low melting point glass allows the bake temperature to be low, so that the range of choice of base members widens.

The glass powder-containing paste C can contain, as an inorganic component other than the glass powder, a high softening point glass powder or a white ceramics powder of silicon oxide, aluminum oxide, titanium oxide, zirconium oxide, barium titanate, etc. in such a range of amount that the property of the barrier rib-reinforcing layer is not impaired, according to need.

It is preferable that the volume average particle diameter (D50) of the inorganic powder contained in the glass powder-containing paste C which sinters at the bake temperature be 0.05 to 50 μm, and it is more preferable that the volume average particle diameter be 0.1 to 10 μm. When the D50 is less than 0.05 μm, the surface roughness Ra of the barrier rib-reinforcing layer is small, so that peeling easily occurs at the time of pattern formation of the barrier rib. On the other hand, when the D50 exceeds 50 μm, the barrier rib-reinforcing layer is prone to contain voids and the strength improving effect tends to be small.

As the organic component that the glass powder-containing paste C contains, a binder resin, a curable monomer, a polymerization initiating agent, a dispersing agent, an organic solvent are preferably presented as examples.

As the method for coating the glass powder-containing paste C, for example, a screen printing method, a bar coater, a roll coater, a die coater, a blade coater, etc. can be cited. After coating by these methods, drying will provide a coat film C.

It is preferable that the coat film C be formed in a larger formation area than the coat film B so as to completely cover and hide the coat film B. Due to this, when the bake step is undergone, contact portions between the base member and the coat film C fuse, so that the peeling off of the coat film C can be prevented. It is preferable that the thickness of the coat film C be 1 to 500 μm, and it is more preferable that the thickness thereof be 10 to 100 μm. When the thickness thereof is less than 1 μm, the strength improving effect sometimes becomes small. On the other hand, when the thickness thereof exceeds 500 μm, there is tendency that the cost of raw materials used will become high, leading to a cost increase. Furthermore, there is tendency that radiation rays will be absorbed by the barrier rib-reinforcing layer formed by the coat film C, decreasing the emission luminance.

After the coat films B and C are formed, the baking thereof provides a detachment aiding layer and a barrier rib-reinforcing layer. The bake step is a step in which the organic component contained by the coat film is decomposed and removed and the glass powder is softened and sintered. The baking conditions vary depending on the composition of the glass powder-containing paste and the kind of the base member. For example, it is preferable that the baking be performed in a baking furnace with an atmosphere of one of air, nitrogen, and hydrogen. As the baking furnace, for example, a batch type baking furnace or a roller transport type continuous baking furnace can be cited. It is preferable that the bake temperature (the highest temperature in the baking profile) be 500 to 1000° C., and it is more preferable that the bake temperature be 500 to 800° C., and it is further preferable that the bake temperature be 500 to 700° C. When the bake temperature is less than 500° C., the decomposition and removal of the organic component sometimes becomes insufficient. On the other hand, when the bake temperature exceeds 1000° C., the base member that can be used as a high heat resistant base member is limited to a ceramic sheet and the like. It is preferable that the duration of baking be 10 to 60 minutes.

The glass powder-containing pastes D and E, after being formed into coating films in the coating step, are pattern-processed so that a barrier rib pattern will be formed. As the pattern processing method, a photosensitive paste method, that is, photolithography, a sand blast method, an imprint method, a machine processing method, etc. can be cited. The photosensitive paste method is preferable because it can produce a pre-bake pattern in a large area with a high yield.

The barrier rib formed by the glass powder-containing paste D serves as a non-sintered barrier rib for separating the barrier rib and the barrier rib-reinforcing layer so as to form a penetrating barrier rib. Therefore, it is preferable that the glass powder-containing paste D, similarly to the glass powder-containing paste B, be a non-sintering paste whose main component is a non-sintering inorganic powder that does not sinter despite undergoing the bake step. On the other hand, the barrier rib formed by the glass powder-containing paste E is sintered to the barrier rib-reinforcing layer to form a barrier rib that construct the cell structure for dividing the scintillator. Therefore, it is preferable that the glass powder of the glass powder-containing paste E, similarly to the glass powder-containing paste C, contain as a main component a glass that softens at the bake temperature, and it is more preferable that the glass powder be a low melting point glass whose softening temperature is less than or equal to 700° C.

In order to obtain a low melting point glass, a metal oxide selected from lead oxide, bismuth oxide, zinc oxide, and alkali metal oxides, which are effective materials for lowering the melting point of glass, can be used. It is desirable that, among these, an alkali metal oxide be used to adjust the softening temperature of the glass. Incidentally, although the alkali metals generally refer to lithium, sodium, potassium, rubidium, and cesium, the alkali metal oxide used in the present invention refers to a metal oxide selected from lithium oxide, sodium oxide, and potassium oxide. In the present invention, it is preferable that the content X ($M_2O$) of the alkali metal oxide in the low melting point glass be within the range 2 to 20 mass %. When the content of the alkali metal oxide is less than 2 mass %, the softening temperature sometimes becomes high so that the bake step needs to be performed at high temperature. Therefore, when a glass substrate is used as the substrate, the glass substrate sometimes deforms in the bake step, so that the obtained scintillator panel will have distortion or the barrier rib will have a defect. Thus, there are cases where the glass substrate is not suitable. Furthermore, when the content of the alkali metal oxide is larger than 20 mass %, the viscosity of the glass can sometimes excessively decrease in the bake step. Therefore, the obtained barrier rib can sometimes easily distort in shape.

The pattern formation step by photolithography can be constituted by an optical exposure step of optically exposing the coat film via a photomask that has a predetermined pattern and a development step of dissolving and removing portions of the post-optical-exposure coat film that are soluble in the developing solution.

The optical exposure step is a step in which, by optical exposure, a necessary portion of the coat film is photo-cured or an unnecessary portion of the coat film is photo-decomposed so that an arbitrary portion of the coat film is made soluble in the developing solution. In the development step, the portion of the post-optical-exposure coat film which is soluble in the developing solution is dissolved and removed by using the developing solution, so that a pre-bake pattern in which only the necessary portion remains can be obtained.

In the optical exposure step, an arbitrary pattern may be directly drawn by laser light or the like, without using a photomask. As the optical exposure apparatus, for example, a proximity optical exposure machine or a laser optical exposure machine can be cited. As the active light ray that is applied in the optical exposure step, for example, near-infrared ray, visible light ray, or ultraviolet ray can be cited; however, ultraviolet ray is preferable. Furthermore, as the light source thereof, for example, a low pressure mercury lamp, a high pressure mercury lamp, a super high-pressure mercury lamp, a halogen lamp, a germicidal lamp, etc. can be cited. A super high-pressure mercury lamp is preferable. The optical exposure condition varies depending on the coating thickness. Normally, optical exposure is performed for 0.01 to 30 minutes by using a super high-pressure mercury lamp whose output is 1 to 100 $mW/cm^2$.

As the method for development in the development step, for example, an immersion method, a spraying method, a brush method, etc. can be cited. As for the developing solution, it suffices that a solvent capable of dissolving the unnecessary portions of the post-optical-exposure coat film is selected as appropriate; however, an aqueous solution whose main component is water is preferable. For example, in the case where the glass powder-containing pastes D and E each contain a polymer that has a carboxyl group, an alkali aqueous solution can be selected as the developing solution. As the alkali aqueous solution, for example, inorganic alkali aqueous solutions of sodium hydroxide, sodium carbonate, calcium hydroxide, etc., or organic alkali aqueous solutions of tetramethyl ammonium hydroxide, trimethylbenzyl ammonium hydroxide, monoethanol amine, diethanol amine, etc. can be cited. Because of the ease of removal in the bake step, an organic alkali aqueous solution is preferable. It is preferable that the concentration of the alkali aqueous solution be 0.05 to 5 mass %, and it is more preferable that the concentration thereof be 0.1 to 2 mass %. When the alkali concentration is excessively low, it sometimes happens that the unnecessary portions of the post-optical-exposure coat film are not sufficiently removed. On the other hand, when the alkali concentration is excessively high, there is risk of corrosion or detachment of the pre-bake pattern. It is preferable that the development temperature be 20 to 50° C. to facilitate process step management.

In order to carry out the processing of the coat film in the pattern formation step by photolithography, it is necessary that the glass powder-containing pastes D and E that are coated in the coating step be photosensitive. That is, it is preferable that the glass powder-containing pastes D and E contain a photosensitive organic component. It is preferable that the percentage of the organic component in the photosensitive glass powder-containing pastes D and E be 30 to 80 mass %, and it is more preferable that the percentage thereof be 40 to 70 mass %. When the organic component is less than 30 mass %, the dispersibility of the inorganic component in the paste decreases so that defects easily occur in the bake step and, moreover, the paste viscosity becomes high and therefore the coatability decreases and, furthermore, the stability of the pastes also decreases. On the other hand, when the organic component exceeds 80 mass %, the shrinkage rate of the pattern in the bake step becomes large so that defects easily occur.

As for the glass powder that the photosensitive glass powder-containing paste E contains, it is preferable that the softening temperature thereof be 480° C. or higher in order to substantially completely remove the organic component in the bake step and secure a strength of the barrier rib finally obtained. When the softening temperature thereof is less than 480° C., the glass powder softens before the organic component is sufficiently removed in the bake step, so that the post-sintering glass has remaining carbon component that is left unburned (hereinafter, sometimes referred to as "carbon residue"), which induces coloration of the barrier rib, leading to such concern as decrease in the luminance of the scintillator panel.

As for the photosensitive glass powder-containing pastes D and E, in order to inhibit light scattering at the time of optical exposure and form a highly accurate pattern, it is preferable that the refractive index n1 of the glass powder and the refractive index n2 of the organic component satisfy the relation $-0.1<n1-n2<0.1,$ and it is more preferable that the refractive indexes n1 and n2 satisfy the relation $-0.01 \leq n1-n2 \leq 0.01,$ and it is further preferable that the refractive indexes n1 and n2 satisfy the relation $-0.005 \leq n1-n2 \leq 0.005.$ Incidentally, the refractive index of the glass powder can be adjusted as appropriate by the composition of the metal oxide that the glass powder contains.

The refractive index of the glass powder can be measured by a Becke line detection method. Furthermore, the refractive index of the organic component can be determined by measuring the coating film made of an organic component by ellipsometry. More concretely, the refractive index (ng) of the glass powder or the organic component at the wavelength 436 nm (g ray) at 25° C. can be set as n1 or n2, respectively.

As the photosensitive organic component that the photosensitive glass powder-containing pastes D and E each contain, for example, a photosensitive monomer, a photosensitive oligomer, and a photosensitive polymer can be cited. Here, the photosensitive monomer, the photosensitive oligomer, and the photosensitive polymer refer to a monomer, an oligomer, and a polymer that, when irradiated with active light ray, undergo reaction, such as photocrosslinking or photopolymerization, changing their chemical structures.

It is preferable that the photosensitive monomer be a compound that has an active carbon-carbon unsaturated double bond. As such a compound, for example, a compound having a vinyl group, an acryloyl group, a methacryloyl group, or a acrylamide group can be cited; however, a multifunctional acrylate compound or a multifunctional methacrylate compound is preferable in order to increase the density of photocrosslinks and form a highly accurate pattern.

It is preferable that the photosensitive oligomer or the photosensitive polymer be an oligomer or a polymer that has an active carbon-carbon unsaturated double bond and that has a carboxyl group. Such an oligomer or a polymer can be obtained, for example, by copolymerizing a carboxyl group-containing monomer, such as acrylic acid, methacrylic acid, itaconic acid, crotonic acid, maleic acid, fumaric acid, vinyl acetic acid, or an acid anhydride of any of these, and a methacrylic acid ester, an acrylic acid ester, styrene, acrylonitrile, vinyl acetate, or 2-hydroxy acrylate.

As the method for introducing an active carbon-carbon unsaturated double bond into the oligomer or the polymer, there can be cited, for example, a method in which with respect to a mercapto group, an amino group, a hydroxyl group, or a carboxyl group that the oligomer or the polymer has, reaction with the following is caused:

acrylic acid chloride, methacrylic acid chloride, or allyl chloride;

an ethylenic unsaturated compound having a glycidyl group or an isocyanate group; or a carboxylic acid such as maleic acid.

Use of a photosensitive monomer or a photosensitive oligomer that has an urethane bond makes it possible to obtain glass powder-containing pastes D and E that can reduce stress in an early period in the bake step and that is less prone to allow pattern defect in the bake step can be obtained.

The photosensitive glass powder-containing pastes D and E may each contain a photopolymerization initiating agent according to need. Here, the photopolymerization initiating agent refers to a compound that, when irradiated with active light ray, produces a radical. As the photopolymerization initiating agent, for example, there can be cited combinations of a photoreducible coloring matter, such as benzophenone, o-benzoyl benzoic acid methyl, 4,4-bis(dimethylamino)benzophenone, 4,4-bis(diethylamino)benzophenone, 4,4-dichlorobenzophenone, 4-benzoyl-4-methyl diphenyl ketone, dibenzyl ketone, fluorenone, 2,2-dimethoxy-2-phenyl acetophenone, 2-hydroxy-2-methyl propiophenone, thioxanthone, 2-methyl thioxanthone, 2-chlorothioxanthone, 2-isopropyl thioxanthone, diethyl thioxanthone, benzyl, benzyl methoxy ethyl acetal, benzoin, benzoin methyl ether, benzoin butyl ether, anthraquinone, 2-t-butyl anthraquinone, anthrone, benzanthrone, dibenzosuberone, methylene anthrone, 4-azidobenzalacetophenone, 2,6-bis(p-azidobenzylidene)cyclohexanone, 2,6-bis(p-azidobenzylidene)-4-methyl cyclohexanone, 1-phenyl-1,2-butadione-2-(O-methoxycarbonyl)oxime, 1-phenyl-1,2-propanedione-2-(O-ethoxycarbonyl)oxime, 1,3-diphenylpropane trione-2-(0-ethoxycarbonyl)oxime, 1-phenyl-3-ethoxypropanetrione-2-(0-benzoyl)oxime, Michler ketone, 2-methyl-1-[4-(methylthio)phenyl]-2-morpholino-1-propanone, 2-benzyl-2-dimethylamino-1-(4-morpholinophenyl) butanone-1, naphthalene sulfonyl chloride, quinoline sulfonyl chloride, N-phenylthioacridone, benzthiazole disulfide, triphenylphorphin, benzoin peroxide, eosin, or methylene blue, and a reducing agent such as ascorbic acid or triethanol amine.

Because the photosensitive glass powder-containing pastes D and E each contain as a photosensitive polymer a polymer that has a carboxyl group, the solubility in the alkali aqueous solution at the time of development improves. It is preferable that the acid value of the polymer that has a carboxyl group be 50 to 150 mg KOH/g. When the acid value thereof is 150 mg KOH/g or less, the development margin becomes wide. On the other hand, when the acid value thereof is 50 mg KOH/g or greater, the solubility in the alkali aqueous solution does not decrease and a high definition pattern can be obtained.

The photosensitive glass powder-containing pastes D and E can each be obtained by compounding various components so as to obtain a predetermined composition and then performing homogeneous mixing and dispersion via a triple roller or a kneader.

The viscosity of the photosensitive glass powder-containing pastes D and E can be adjusted as appropriate by the percentage of an additive, such as an inorganic powder, an viscosity-increasing agent, an organic solvent, a polymerization inhibiting agent, a plasticizing agent, or an anti-settling agent; however, it is preferable that the range thereof be 2 to 200 Pa·s. For example, in the case where the photosensitive glass powder-containing pastes D and E are coated on the base member by a spin coating method, a viscosity of 2 to 5 Pa·s is preferable. In the case where the photosensitive glass powder-containing pastes D and E are coated on the base member by a blade coater method or a die coater method, a viscosity of 10 to 50 Pa·s is preferable. In the case where the photosensitive glass powder-containing pastes D and E are each coated by performing a screen printing method once so as to obtain a coat film having a film thickness of 10 to 20 µm, a viscosity of 50 to 200 Pa·s is preferable.

The pre-bake barrier rib pattern obtained by photolithography is baked to decompose and remove the organic component contained in the glass powder-containing pastes D and E and soften and sinter the glass powder, so that a post-bake barrier rib pattern is obtained. The baking conditions vary depending on the compositions of the glass powder-containing pastes D and E and the kind of the base member; however, the bake can be carried out, for example, in a baking furnace with an air, nitrogen or hydrogen atmosphere. As the baking furnace, for example, a batch type baking furnace or a belt type continuous baking furnace can be cited. It is preferable that the bake temperature (the highest temperature in the baking profile) be 500 to 1000° C., and it is more preferable that the bake temperature be 500 to 800° C., and it is further preferable that the bake temperature be 500 to 700° C. When the bake temperature is less than 500° C., the decomposition and removal of the organic component is sometimes insufficient. On the other hand, when the bake temperature exceeds 1000° C., the base member that can be used as a high heat resistant base member is limited to a ceramic sheet or the like. It is preferable that the baking duration be 10 to 60 minutes.

As the method for coating the glass powder-containing pastes D and E, for example, a screen printing method, a bar coater, a roll coater, a die coater, or a blade coater can be cited. As for the position at which to form the penetrating barrier rib from the glass powder-containing paste D, it is preferable that the wall be formed in a frame shape around the barrier rib formation range. A necessary shape can be obtained by pattern printing in the case of a screen printing method or entire surface coating in the case of a die coater and then by performing optical exposure and development. The coat film D that is formed becomes a non-sintered barrier rib after being baked. It is preferable that the thickness thereof be 0.1 to 100 µm, and it is more preferable that the thickness thereof be 1 to 30 µm. When the thickness of the non-sintered barrier rib is less than 1 µm, there is tendency that it becomes less easy to detach the three-dimensional structural object from the base member after the bake step. On the other hand, when its thickness exceeds 30 µm, the non-sintered barrier rib is excessively easily detachable so that the pattern sometimes partially peels off during the bake step.

The glass powder-containing paste E, after being uniformly coated on the coat films C and D, is subjected to pattern processing and baking to form a barrier rib. It is preferable that the thickness thereof be 50 to 3000 µm, and it is more preferable that the thickness thereof be 100 to 500 µm. When the thickness thereof exceeds 3000 µm, there are cases where the pattern formation at the time of processing is difficult. When the thickness thereof is less than 50 µm, the amount of the fluorescent loaded in the cells formed by the barrier rib reduces, so that there are cases where the emission luminance of the scintillator panel decreases and therefore a clear image cannot be obtained.

It is preferable that the intervals between adjacent barrier ribs be 30 to 1000 µm. When the intervals are less than 30 µm, there are cases where the workability at the time of forming the barrier rib is low. On the other hand, when the intervals exceed 1000 µm, there are cases where the sharpness of the images on the obtained scintillator panel is low.

It is preferable that the width of the barrier rib be 5 to 150 µm, and it is more preferable that the width thereof be 10 to 150 µm. When the width of the barrier rib is less than 5 µm, there are cases where defects of the pattern of the lattice shape easily occur. On the other hand, when the width thereof exceeds 150 µm, the amount of the fluorescent that can be loaded in the spaces divided by the barrier rib becomes small, so that there are cases where the emission luminance of the obtained scintillator panel decreases.

It is preferable that the aspect ratio of the thickness of the barrier rib to the barrier rib width (thickness/width) be 1.0 to 50.0. The greater the aspect ratio of the barrier rib, the larger the space for each one of the pixels divided by the barrier ribs and the more fluorescent can be loaded.

The thickness and width of the barrier rib can be measured by exposing a cross-section of the barrier rib that is perpendicular to the substrate and observing the cross-section by a scanning type electron microscope (S2400, made by Hitachi, Ltd.).

In order to prevent the light leakage from the barrier rib, it is preferable that the reflective layer F be formed so as to cover the surface of the barrier rib. As the material of the reflective layer F, for example, a substance that transmits radiation rays and that reflects the light that is an electromagnetic wave of 300 to 800 nm emitted by the fluorescent can be cited. Because of being low in the degree of degradation, a metal, such as Ag, Au, Al, Ni, or Ti, or a metal oxide, such as $TiO_2$, $ZrO_2$, $Al_2O_3$, or ZnO, is preferable.

As the formation method for the reflective layer F, for example, a vacuum film formation method, a plating method, a paste coating method, a jetting method by spraying, etc.

In the case where the reflective layer F is a metal film, it is preferable that the film thickness of the reflective film F be 0.05 to 1 µm, and it is more preferable that the film thickness be 0.1 to 0.5 µm. When the film thickness is less than 0.05 µm, there are cases where the light transmittance becomes large and the reflectance of the metal film becomes low. When the film thickness exceeds 1 µm, there are cases where the absorption of light becomes large and the reflectance decreases and, besides, layer formation requires a long time. In the case where the reflective layer F is a metal oxide film, it is preferable that the layer thickness be 1 to 50 µm, and it is more preferable that the layer thickness be 5 to 20

μm. In the case where the layer thickness is less than 1 μm, the light transmittance becomes large and, in some cases, the advantageous effect of diffuse reflection becomes low. When the layer thickness exceeds 50 μm, the amount of the fluorescent that can be loaded into the spaces divided by the barrier rib becomes small, so that there are cases where the emission luminance of the obtained scintillator panel decreases.

As the fluorescent G, for example, CsI, $Gd_2O_2S$, $Lu_2O_2S$, $Y_2O_2S$, $LaCl_3$, $LaBr_3$, $LaI_3$, $CeBr_3$, $CeI_3$, LuSiOs, or Ba (Br, F), which is high in the rate of conversion from radiation rays to visible light, can be cited.

In order to increase the light emission efficiency, an activator agent may be added to the fluorescent. As the activator agent, for example, sodium (Na), indium (In), thallium (Tl), lithium (Li), potassium (K), rubidium (Rb), sodium (Na), terbium (Tb), cerium (Ce), europium (Eu), or praseodymium (Pr) can be cited. Because of being high in chemical stability and high in light emission efficiency, a fluorescent obtained by adding Tb to $Gd_2O_2S$ is preferable.

As the loading method for the fluorescent G, for example, besides a method in which crystalline CsI is vacuum deposited and a method in which a fluorescent slurry dispersed in water is coated, a method in which a fluorescent paste obtained by mixing a fluorescent powder, ethyl cellulose, an acrylic resin, etc. with a solvent, such as terpineol, is coated by screen printing or a dispenser can be cited. In order to prevent entry of bubbles into the cells, coating in a vacuum environment is also preferable.

The region in which to coat the fluorescent G is the entire area of the effective display region, and the penetrating barrier rib formation portions to be used for alignment are provided with masking or the like and therefore are not coated.

The thickness of the fluorescent G can be arbitrarily set. However, in the case where the increase in the sharpness caused by the barrier rib is specifically pursued, it is preferable that the thickness of the fluorescent G be 50 to 100% of the thickness of the barrier rib, and it is more preferable that the thickness of fluorescent G be 80 to 100% of the thickness of the barrier rib. When the thickness of the fluorescent G is less than 50% of the thickness of the barrier rib, it sometimes happens that the amount of the fluorescence relative to the cell volume is small and the luminance decreases. When the thickness of the fluorescent G exceeds 100% of the thickness of the barrier rib, there are cases where light leakage to adjacent photoelectric conversion elements occurs and the sharpness decreases. However, in the case where decrease in the sharpness can be accepted, a loading thickness of 100% or greater can also be set.

As described above, the scintillator layer formed by stacking the layers on the base member A can be detached by utilizing the non-sintered detachment aiding layer. In order to provide the base member A with heat resistance, a flat sheet of a glass, a ceramic, a metal, etc. is used. However, in the case where a member whose absorption of radiation rays is great, there are cases where radiation rays attenuate before reaching the fluorescent so that the emission luminance decreases. In the present invention, the base member A is detached and replaced with a different base member B whose radiation ray absorption is small, which leads to improvement of the emission luminance and brings about great advantage in property.

As for a detachment technique, cutting is carried out inside the area in which the detachment aiding layer is formed but outside the range that is desired to be used as the effective region of the scintillator. Due to this, the base member A and the scintillator layer above the barrier rib-reinforcing layer on opposite sides of the detachment aiding layer can be detached (separated) from each other. The detachment can be facilitated by inserting a thin film member, such as a spacer, or blowing a small amount of air into a detachment aiding layer portion.

Using a similar technique, the barrier rib-reinforcing layer can be detached and removed from the non-sintered barrier rib portion that is provided around the detached scintillator layer. Due to this, surroundings of the scintillator layer can be provided as penetrating barrier ribs that are to be used for the alignment with the photoelectric conversion element.

By laminating this to a base member B made of a material whose radiation ray absorption is small by using an adhesive resin or a tacky tape, a scintillator panel can be produced.

As the adhesive resin, for example, it is preferable to use a material obtained by mixing a solvent with an organic resin such as an acrylic resin, an epoxy resin, a polyester resin, a butyral resin, a polyamide resin, an ethyl cellulose resin. As the tacky tape, for example, a tape coated with the foregoing adhesive resin can be used; however, it is preferable to use a double-sided tape both sides of which are coated with an adhesive resin.

As the base member B, a base member made of a material that has radiation ray transmitting capability, such as a macromolecule, a ceramics, a semiconductor, a metal, or a glass, can be used. As such a base member, there can be cited, for example:
a macromolecular film, such as a polyester film, a cellulose acetate film, a polyamide film, a polyimide film, a polycarbonate film, or a carbon fiber-reinforced resin sheet;
a ceramics substrate of alumina, aluminum nitride, mullite, steatite, silicon nitride, silicon carbide, etc.;
a glass ceramics substrate obtained by mixing and sintering a ceramics powder and a powder of glass;
a semiconductor substrate made of a semiconductor, such as silicon, germanium, gallium arsenide, gallium phosphide, or gallium nitrogen;
a metal sheet, such as an aluminum sheet, an iron sheet, or a copper sheet;
a glass sheet made of a glass, such as quartz, a borosilicate glass, or a chemically reinforced glass;
a metal sheet having a covering layer of a metal oxide; or an amorphous carbon substrate.
Among these, a macromolecular film made of a macromolecular material is preferable because the macromolecular film is made up of a material that mainly includes carbon atoms and hydrogen atoms, whose atomic numbers are small, and is high in radiation ray transmittance.

It is preferable that the thickness of the base member B be 1 mm or less in order to inhibit the radiation ray absorption by the base member.

It is preferable that the reflectance of the base member B be 90% or greater. When the reflectance thereof is 90% or greater, the emission luminance of the scintillator panel improves. As the base member whose reflectance is 90% or greater, for example, a film of white polyethylene terephthalate (hereinafter, sometimes referred to as "PET") that is used as a reflective plate in a liquid crystal display is preferably cited. Herein, the reflectance refers to SCI reflectance at a wavelength of 530 nm measured by using a spectrophotometer (for example, CM-2600d, made by Konica Minolta, Inc.).

It is preferable that portions of the base member B that corresponds to the penetrating barrier rib portions be provided with opening portions or cutout portions. Furthermore, the opening portions or cutout portions may be formed by a transparent member. This allows the lattice shaped barrier rib to be exposed in a scintillator surface.

The scintillator panel produced in this manner allows the photoelectric conversion element pattern of the light-receiving substrate to be viewed through the barrier rib of the lattice shape exposed in the surface, so that they can be placed close to each other, highly accurately aligned, and laminated together. Thus, a radiation detection apparatus whose pixel pitch deviation is small can be produced.

As for a technique for the alignment, while a CCD camera or the like is picking up enlarged images of barrier rib and photoelectric conversion elements, their positional deviations are corrected so as to make adjustment such that the barrier rib coincides with the wiring pattern of the photoelectric conversion elements that the barrier rib faces; thus, the alignment can be carried out. After the alignment, an adhesive resin or a tacky tape can be used to laminate the two members together. As the adhesive resin or the tacky tape, an ultraviolet ray-curable resin that is cured by irradiating it with ultraviolet ray can also be used, besides the material used to laminate the scintillator layer and the base member B together.

It is preferable that the regions that are adhered by using these be non-display regions in an outer perimeter portion of the scintillator panel. In some cases, depending on the members that are used for the lamination, a gap is formed between the scintillator and the photoelectric conversion elements, so that emitted light leaks into adjacent pixels, causing a decrease in the sharpness, or the light-transmitting property decreases, causing a decrease in the light emission efficiency. Therefore, it is preferable to have, as much as possible, a construction in which the adhesion is carried out in the non-display region and, in the display region, the scintillator layer and the photoelectric conversion elements are in direct contact with each other. In order to stably have the two members in close contact with each other in the display region, it is also preferable that a cushion member that has a shape conformity property, such as a sponge sheet, be disposed on the back side of the scintillator panel and, while the panel is pressed, the assembly be carried out to provide a radiation detection apparatus.

EXAMPLES

The present invention will be described more in detail hereinafter with reference to Examples and Comparative Examples. However, the present invention is not limited to these.

(Raw Materials of Pastes)

The raw materials used to make the pastes were as follows.
Photosensitive monomer M-1: trimethylol propane triacrylate
Photosensitive monomer M-2: tetrapropylene glycol dimethacrylate
Photosensitive polymer: a polymer obtained by addition reaction of 0.4 equivalent of glycidyl methacrylate with carboxyl groups of a copolymer made up of methacrylic acid/methyl methacrylate/styrene=40/40/30 in mass ratio (weight-average molecular weight of 43000, acid value of 100)
Binder resin: 100 cP ethyl cellulose
Photopolymerization initiating agent: 2-benzyl-2-dimethylamino-1-(4-morpholinophenyl)butanone-1 (IC369, made by BASF company)
Thermal polymerization initiating agent: V-40
Polymerization inhibiting agent: 1,6-hexanediol-bis[(3,5-di-t-butyl-4-hydroxyphenyl)propionate])
Ultraviolet absorbent solution: 0.3 mass % γ-butyrolactone solution of Sudan IV (made by TOKYO OHKA KOGYO CO., LTD.)
Viscosity modifier agent: FLOWNON EC121 (made by Kyoeisha Chemical Co., Ltd.)
Solvent A: γ-butyrolactone
Solvent B: terpineol
Low softening point glass powder: 27 mass % $SiO_2$, 31 mass % $B_2O_3$, 6 mass % ZnO, 7 mass % $Li_2O$, 2 mass % MgO, 2 mass % CaO, 2 mass % BaO, 23 mass % $Al_2O_3$, refractive index (ng): 1.56, glass softening temperature of 588° C., coefficient of linear expansion of $70 \times 10^{-7}$ ($K^{-1}$), average particle diameter of 2.3 μm
High softening point glass powder: 30 mass % $SiO_2$, 31 mass % $B_2O_3$, 6 mass % ZnO, 2 mass % MgO, 2 mass % CaO, 2 mass % BaO, 27 mass % $Al_2O_3$, refractive index (ng): 1.55, softening temperature of 790° C., thermal expansion coefficient of $32 \times 10^{-7}$ ($K^{-1}$), average particle diameter of 2.3 μm
Silicon oxide powder: SO-E1 made by Admatechs Company Limited, average particle diameter of 0.25 μm
Titanium oxide powder: ST-21 made by ISHIHARA SANGYO KAISHA, LTD., average particle diameter of 0.02 μm
Fluorescent powder: 3010-54TOR made by NICHIA CORPORATION, average particle diameter of 10 μm (Manufacture of Glass Powder-Containing Paste B)

3 mass parts of the binder resin, 1.5 mass parts of the photosensitive monomer M-1, 0.5 mass part of the photosensitive monomer M-2, and 0.05 mass part of an thermal polymerization initiating agent were thermally dissolved in 55 mass parts of the solvent B at a temperature of 60° C. After the obtained organic solution was cooled, 40 mass parts of the silicon oxide powder was added and kneading was performed by a triple-roller kneader to make a glass powder-containing paste B.

(Manufacture of Glass Powder-Containing Paste C)

4 mass parts of binder resin was thermally dissolved in 50 mass parts of the solvent B at a temperature of 60° C. After the obtained organic solution was cooled, 46 mass parts of the low softening point glass powder was added and then kneading was performed by a triple-roller kneader to make a glass powder-containing paste C.

(Manufacture of Glass Powder-Containing Paste D)

4 mass parts of the photosensitive monomer M-1, 6 mass parts of the photosensitive monomer M-2, 24 mass parts of the photosensitive polymer, 6 mass parts of the photopolymerization initiating agent, 0.2 mass part of the polymerization inhibiting agent, and 12.8 mass parts of the ultraviolet absorbent solution were thermally dissolved in 38 mass parts of the solvent A at a temperature of 80° C. After the obtained solution was cooled, 9 mass parts of the viscosity modifier agent was added to make an organic solution 1.5 mass parts of the low softening point glass powder and 35 mass parts of the high softening point glass powder were added to 60 mass parts of the organic solution 1. Then, kneading was performed by a triple-roller kneader to make a glass powder-containing paste D.

(Manufacture of Glass Powder-Containing Paste E)

30 mass parts of the low softening point glass powder and 10 mass parts of the high softening point glass powder were added to 60 mass parts of the organic solution 1. Then, kneading was performed by a triple-roller kneader to make a glass powder-containing paste E.

(Reflective Layer Paste F)

3 mass parts of the binder resin was thermally dissolved in 37 mass parts of the solvent B at a temperature of 60° C. After the obtained organic solution was cooled, 60 mass parts of the titanium oxide powder was added and then kneading was performed by a triple-roller kneader to make a reflective layer paste F.

(Fluorescent Paste G)

3 mass parts of the binder resin was thermally dissolved in 20 mass parts of the solvent B at a temperature of 60° C. After the obtained organic solution was cooled, 77 mass parts of the fluorescent powder was added and then stirring was performed by a stirring mixing machine to make a fluorescent paste G.

Example 1

As the base member A, a 500 mm×500 mm×1.8 mm glass sheet (PD-200, made by Asahi Glass Co., Ltd., a coefficient of linear expansion of $83 \times 10^{-7}$ ($K^{-1}$)) was used. Over a surface of the base member A, the glass powder-containing paste B was entirely coated by screen printing and dried so as to have a dry thickness of 5 μm. Thus, a coat film B was formed. Over a surface of the coat film B, the glass powder-containing paste C was entirely coated by a die coater and dried so as to have a dry thickness of 24 μm. Thus, a coat film C was formed. At this time, an arrangement was made so that the coating area of the coat film C was larger than that of the coat film B and covers the entire coat film B. This was baked in air at 585° C. for 15 minutes. Due to the baking, the organic component burned out, the coat film B became a non-sintered detachment aiding layer, and the coat film C became a barrier rib-reinforcing layer that was a sintered layer. Since the coat film C was formed in a larger area than the coat film B as described above, the direct contact areas between the base member A and the coat film C were fused after the baking, without detachment of the coat film C.

On a surface of the barrier rib-reinforcing layer, the glass powder-containing paste D was coated by screen printing and dried so as to have a dry thickness of 30 μm. Thus, a coat film D was formed. The coat film D was formed into a 5-mm-wide frame-shaped pattern of 430 mm×430 mm. Over a surface of the barrier rib-reinforcing layer and the coat film D, the glass powder-containing paste E was entirely coated by a die coater and dried so as to have a dry thickness of 300 μm. Thus, a coat film E was formed. Next, the coat films D and E were optically exposed with an optical exposure amount of 750 mJ/cm$^2$ by using a super high-pressure mercury lamp, via a photomask having predetermined pattern (a chrome mask having lattice-shaped pattern pitch of 127 μm, and the width of 20 μm, and a pattern size of 430 mm×430 mm). The post-optical-exposure coat films D and E were developed in a 0.5 mass % monoethanol amine aqueous solution so that the unexposed portion was removed. Thus, a pre-bake barrier rib pattern of the lattice shape was obtained. The obtained pre-bake barrier rib pattern of the lattice shape was baked in air at 585° C. for 15 minutes to obtain a barrier rib pattern of the lattice shape. Since the barrier rib area formed by the coat film D did not sinter by the baking, the barrier rib area became a non-sintered barrier rib. On the other hand, the barrier rib area formed by the coat film E was able to form a firm barrier rib pattern due to the fused glass. The barrier rib was formed to have a width of 25 μm and a thickness of 250 μm. The non-sintered barrier rib portion formed in a peripheral area was masked by a tape so as not to be loaded with the fluorescent in a later step.

The reflective layer paste F was coat over the entire surface of the barrier rib by using a die coater so as to have a thickness of 300 μm. The reflective layer paste F, together with the substrate, was placed into a vacuum chamber and degassed at 300 Pa for 20 minutes to load the reflective layer paste F into the cells. After the loading, surplus reflective layer paste F was removed by leveling off the paste F at the thickness of the barrier rib. Then, the reflective layer paste F was subjected to drying in a hot air oven at 150° C. to remove the solvent material. Thus, a reflective layer F was obtained. The thickness of the reflective film F on the barrier rib surface was 10 μm. Over the barrier rib with the reflective film formed thereon, the fluorescent paste G was entirely coated by using a die coater so as to have a thickness of 300 μm. Under the same conditions as the reflective layer, the fluorescent was loaded into the cells. The fluorescent was uniformly loaded in the cells and had a thickness of 230 μm.

The tape used for masking was removed. Then, using a glass cutter, cleaving was performed on an outer side of the barrier rib formation area but an inner side of the detachment aiding layer. By inserting a SUS spacer of 50 μm in thickness into the detachment aiding layer portion exposed on the substrate end surface, the base member A and the scintillator layer above the barrier rib-reinforcing layer were able to be detached (separated) from each other. By a similar technique, the barrier rib-reinforcing layer was detached and removed from the non-sintered barrier rib formed around the scintillator layer. As a result, a periphery around the scintillator layer was able to be provided as a penetrating barrier rib that did not have either the fluorescent or the barrier rib-reinforcing layer. As the base member B, a base member in which the four corners of a 430 mm×430 mm×0.18 mm white PET film ("Lumirror (registered trademark)" E6SQ, made by Toray Industries, Inc., and having a reflectance of 97%) were provided 5-mm-wide slit openings was prepared. A sticky sheet was stuck to a surface of the base member. This was laminated on the barrier rib-reinforcing layer side of the scintillator layer to produce a scintillator panel.

The obtained scintillator panel was set directly over and close to the photoelectric conversion elements of FPD (PaxScan 2520, made by Varian company). Using a CCD camera, the pattern of the photoelectric conversion elements was viewed through the barrier rib of the lattice shape exposed in the opening portions of the base member B and the two members were aligned so as to coincide with each other. Then, the two members were laminated together by adhering and fixing perimeter portions thereof with an adhesive to form a radiation detection apparatus. The radiation detection apparatus was irradiated from the substrate side of the scintillator panel with X-ray at a tube voltage of 60 kV, and the amount of light emission from the scintillator layer was detected by an FPD, and the luminance was evaluated. Furthermore, the image clearness was evaluated on the basis of picked-up images of rectangular wave charts. The luminance and the image clearness of the scintillator panel were both good.

Example 2

A scintillator panel was produced by substantially the same method as in Example 1, except that the photomask to be used for the barrier rib pattern processing had a pattern pitch of 254 μm and that the pixel pitch was twice the pixel pitch in Example 1.

The obtained scintillator panel was aligned and laminated with photoelectric conversion elements of an FPD identical to the one in Example 1 so as to create a radiation detection apparatus in which the pixel pitch of the barrier rib was twice the pixel pitch of the photoelectric conversion elements. With the evaluation values in Example 1 being 100, the relative value of the luminance was 170 and the evaluation value of the degree of image clearness was 80, providing results that the effect of improving luminance was great while the degree of image clearness decreased.

Comparative Example 1

A scintillator panel that was similar to the scintillator panel illustrated in conjunction with Example 1 but that did not have in its perimeter a structure with exposed barrier rib having a light-transmitting property was produced, and the scintillator panel was laminated on photoelectric conversion elements to create a radiation detection apparatus. The alignment of the pixels was carried out by inserting a camera with two fields of view between the panels and simultaneously taking images of the pattern surface of the photoelectric conversion elements and the scintillator panel. With the evaluation values in Example 1 being 100, the relative value of the luminance was 80 and the evaluation value of the degree of image clearness was 80, providing results that the values were both below those in Example 1. This is speculated to be because, due to the positional deviation between the pixels of the barrier rib and the pixels of the photoelectric conversion elements, barrier rib portions that did not emit light were present in the light-receiving areas of the photoelectric conversion elements, resulting in a decrease in the light-receiving efficiency, and emitted light leaked into adjacent photoelectric conversion elements, resulting in a failure to provide a proper degree of image clearness. As causes for the positional deviation, accuracy of the optical axis of the camera with two fields of view, accuracy of the drive axis for the panel lamination, etc. can be speculated, each one of which can be speculated to be an adverse effect of the alignment performed in a state in which the panels to be laminated together were spaced from each other by a distance.

Comparative Example 2

A scintillator layer having a barrier rib structure on the base member A can be formed by omitting, in the production method illustrated in conjunction with Example 1, the step of forming the detachment aiding layer and the non-sintered barrier rib. At this time, by altering the photomask's pattern layout, the barrier rib can be caused to form marks having an identical shape at positions corresponding to the positions of the alignment marks of the photoelectric conversion elements. The marks had a cross shape having a wire width of 100 microns and longitudinal and lateral widths of 1000 microns. Using this photomask, a scintillator panel was created. Since the detachment aiding layer was not provided, the scintillator layer was not detached from the base member A. The alignment was carried out by using a CCD camera so that the marks formed by the barrier rib and the alignment marks of the photoelectric conversion elements match each other in position, and then the lamination was carried out to create a radiation detection apparatus. With the evaluation values in Example 1 being 100, the relative value of the luminance was 70 and the evaluation value of the degree of image clearness was 80, providing results that the values were lower than those in Example 1. It is speculated that the decrease in luminance evaluation value resulted from the fact that the X-ray absorption by the base member A was greater than that achieved by a white PET film as used in Example 1 and the decrease in the degree of image clearness resulted from the positional deviation of the pixels as in Comparative Example 1. It is speculated that this positional deviation resulted from the fact that the cross-shaped marks formed by the barrier rib existed at positions independent of the lattice pattern, strain easily occurred during the baking so that deviations from the designed dimensions/positions occurred.

EXPLANATION OF NUMERALS

1: Radiation detection apparatus
2: Scintillator panel
3: Light-receiving substrate
4: Base member opening portion
5: Base member B
6: Barrier rib
6': Penetrating barrier rib
7: Photoelectric conversion element
8: Wiring pattern
9: Sticky layer
10: Barrier rib-reinforcing layer
11: Reflective film
12: Fluorescent
13: Output layer
14: Substrate
15: Electric power source portion
16: Adhesion layer
17: Base member A
18: Coat film B
19: Coat film D
20: Coat film E
21: Non-sintered barrier rib The radiation detection apparatus of the present invention can be used in a medical diagnosis apparatus, a nondestructive test instrument, etc. Furthermore, the present invention is also a scintillator panel that constitutes the radiation detection apparatus.

The invention claimed is:

1. A scintillator panel defining a pixel structure, the scintillator panel comprising:
   (i) a base member of a sheet shape;
   (ii) a barrier rib of a lattice shape formed on the base member dividing cells;
   (iii) a fluorescent loaded in the cells;
   (iv) at least a portion of a non-display region in an outer perimeter portion of the base member has an opening,
   wherein in the portion of the base member having an opening, the barrier rib of the lattice shape is exposed on both obverse and reverse sides, and
   wherein the exposed portion has a light-transmitting property.

2. The scintillator panel according to claim 1, wherein the barrier rib of the lattice shape is made of a material whose main component is a low melting point glass that contains 2 to 20 mass % of an alkali metal oxide.

3. The scintillator panel according to claim 1, wherein a surface of the barrier rib is provided with a reflective layer.

4. A method for producing the scintillator panel according to claim 1, the production method for the scintillator panel comprising a step of coating on a base member A a photosensitive paste that contains a low melting point glass and a photosensitive organic component and forming a photosensitive paste coat film, an optical exposure step of optically exposing the photosensitive paste coat film to a predetermined pattern, a development step of dissolving and removing a portion of a post-optical-exposure photosensitive paste coat film which is soluble in a developing solution, a bake step of forming barrier ribs by heating a post-development photosensitive paste coat film pattern to a bake temperature of 500° C. to 700° C. so that an organic component is removed and the low melting point glass is softened and sintered, a step of forming a scintillator layer by loading a fluorescent between the barrier ribs, a step of detaching the scintillator layer from the base member A, and a step of laminating the scintillator layer on a base member B at least a portion of which has an opening portion or a cutout portion.

5. A radiation detection apparatus in which the scintillator panel according to claim 1 and a light-receiving substrate that includes photoelectric conversion elements arranged so that a pixel pitch of the photoelectric conversion elements corresponds to a pixel pitch of the barrier rib of the lattice shape of the scintillator panel are laminated together.

6. The radiation detection apparatus according to claim 5, wherein the pixel pitch of the barrier rib of the lattice shape is an integer multiple of the pixel pitch of the photoelectric conversion elements.

7. The radiation detection apparatus according to claim 5, wherein the non-display region in the outer perimeter portion of the scintillator panel is adhered to the light-receiving substrate by an adhesive resin or a tacky tape.

\* \* \* \* \*